(12) United States Patent
Kawaguchi

(10) Patent No.: US 9,580,582 B2
(45) Date of Patent: *Feb. 28, 2017

(54) THERMOPLASTIC RESIN COMPOSITION AND TIRE USING SAME

(75) Inventor: Koichi Kawaguchi, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 296 days.

This patent is subject to a terminal disclaimer.

(21) Appl. No.: 13/818,907

(22) PCT Filed: May 17, 2011

(86) PCT No.: PCT/JP2011/061704
§ 371 (c)(1),
(2), (4) Date: Feb. 25, 2013

(87) PCT Pub. No.: WO2012/026166
PCT Pub. Date: Mar. 1, 2012

(65) Prior Publication Data
US 2013/0146194 A1    Jun. 13, 2013

(30) Foreign Application Priority Data
Aug. 26, 2010 (JP) ................ 2010-189558

(51) Int. Cl.
| | | |
|---|---|---|
| *C08L 29/08* | (2006.01) | |
| *C08L 77/00* | (2006.01) | |
| *C08L 15/00* | (2006.01) | |
| *C08L 29/04* | (2006.01) | |
| *C08L 77/02* | (2006.01) | |
| *C08L 77/06* | (2006.01) | |
| *B60C 1/00* | (2006.01) | |
| *C08L 51/06* | (2006.01) | |
| *B29D 30/06* | (2006.01) | |
| *C08C 19/04* | (2006.01) | |

(52) U.S. Cl.
CPC ............ *C08L 15/00* (2013.01); *B60C 1/0008* (2013.04); *C08L 29/04* (2013.01); *C08L 51/06* (2013.01); *C08L 77/00* (2013.01); *C08L 77/02* (2013.01); *C08L 77/06* (2013.01); *B29D 2030/0682* (2013.01); *C08C 19/04* (2013.01); *C08L 2205/03* (2013.01); *Y10T 152/10495* (2015.01)

(58) Field of Classification Search
None
See application file for complete search history.

(56) References Cited

U.S. PATENT DOCUMENTS

| | | |
|---|---|---|
| 2010/0112257 A1 | 5/2010 | Morooka |
| 2010/0175802 A1 | 7/2010 | Morooka |
| 2011/0028651 A1 | 2/2011 | Kawaguchi et al. |

FOREIGN PATENT DOCUMENTS

| | | |
|---|---|---|
| EP | 2184323 A1 | 5/2010 |
| EP | 2290003 A2 | 3/2011 |
| JP | 2010-132850 A | 6/2010 |
| JP | 5577922 B2 | 8/2014 |
| WO | WO-2007081323 A1 | 7/2007 |

OTHER PUBLICATIONS

Supplementary European Search Report issued on Jan. 23, 2014 in counterpart Application No. EP11819641.
Official Communication dated May 5, 2015 issued in counterpart EP Appln. 11819641.9.

*Primary Examiner* — Ana Woodward
(74) *Attorney, Agent, or Firm* — Polsinelli PC

(57) ABSTRACT

Provided is a thermoplastic resin composition for the inner liner of pneumatic tires, which has low air permeability and a small percent change in air permeability from fatigue. A thermoplastic resin composition obtained by dispersing a modified rubber having an acid anhydride group or an epoxy group into a polyamide resin and an ethylene vinyl alcohol copolymer, the thermoplastic resin composition being characterized in that the ratio of the polyamide resin to the ethylene vinyl alcohol copolymer is between 47/53 and 61/39. The percent change in air permeability of the thermoplastic resin composition in the present invention when subjected 1 million times to 20% elongation strain at room temperature is 1.30 times or more. Additionally, a pneumatic tire using a film comprising the thermoplastic resin composition in the present invention as an inner liner has a percent change in air leakage of 1.30 times or less at room temperature after going 70,000 km.

20 Claims, No Drawings

US 9,580,582 B2

THERMOPLASTIC RESIN COMPOSITION AND TIRE USING SAME

CROSS REFERENCE TO RELATED APPLICATIONS

This application is a National Phase filing under 35 U.S.C. §371 of PCT/JP2011/061704 filed on May 17, 2011; and this application claims priority to Application No. 2010-189558 filed in Japan on Aug. 26, 2010, under 35 U.S.C. §119; the entire contents of all are hereby incorporated by reference.

TECHNICAL FIELD

The present invention relates to a thermoplastic resin composition. More specifically, the present invention relates to a thermoplastic resin composition usable for an inner liner of a pneumatic tire.

BACKGROUND ART

It is known to use a thermoplastic resin composition obtained by dispersing a modified rubber in a polyamide resin for an inner liner of a pneumatic tire, and in order to improve (decrease) air permeability, further blending of an ethylene-vinyl alcohol copolymer. See Japanese Unexamined Patent Publication No. 2010-132850.

SUMMARY OF THE INVENTION

Problems to be Solved by the Invention

The air permeability of the polyamide resin is decreased by using an ethylene-vinyl alcohol copolymer in combination. However, no attention is focused on the change in air permeability due to fatigue. An object of the present invention is to provide a thermoplastic resin composition having low air permeability and ensuring a small change in air permeability due to fatigue.

Means to Solve the Problems

The present inventors have taken note of the change in air permeability due to fatigue and found that when the blending ratio between a polyamide resin and an ethylene-vinyl alcohol copolymer is optimized, a thermoplastic resin composition having a low air permeability and ensuring a small change in air permeability due to fatigue can be obtained. The present invention has been accomplished based on this finding.

The present invention is a thermoplastic resin composition comprising a polyamide resin and an ethylene-vinyl alcohol copolymer, and a modified rubber having an acid anhydride group or an epoxy group dispersed in the polyamide resin and the ethylene-vinyl alcohol copolymer, wherein the blending ratio between the polyamide resin and the ethylene-vinyl alcohol copolymer is from 47/53 to 61/39.

The polyamide resin is preferably at least one selected from the group consisting of nylon 6, nylon 66 and nylon 6/66.

The modified rubber having an acid anhydride group or an epoxy group is preferably an ethylene-α-olefin copolymer, or an ethylene-unsaturated carboxylic acid copolymer or a derivative thereof.

The content of the modified rubber is preferably from 70 to 280 parts by weight based on 100 parts by weight of the total amount of the polyamide resin and the ethylene-vinyl alcohol copolymer.

In the thermoplastic resin composition, the change in air permeability when a 20% elongation strain is repeatedly applied 1,000,000 times at room temperature is preferably 1.30 times or less.

In the thermoplastic resin composition, the air permeability after repeatedly applying a 20% elongation strain 1,000,000 times at room temperature is preferably $10 \times 10^{12}$ cc·cm/cm$^2$·sec·cmHg or less.

The polyamide resin is preferably a modified polyamide resin obtained by melt-blending a polyamide resin and a compound capable of reacting with a terminal amino group of the polyamide resin.

The compound capable of reacting with a terminal amino group of the polyamide resin is preferably a monofunctional epoxy compound.

The present invention is also a pneumatic tire comprising, as an inner liner, a film comprising the above thermoplastic resin composition.

In the pneumatic tire, the change in air leakage after 70,000 km indoor running is preferably 1.30 times or less.

In the pneumatic tire, the air leakage after 70,000 km indoor running is preferably 1.5% or less.

Effects of the Invention

The thermoplastic resin composition of the present invention has a low air permeability and ensures a small change in air permeability due to fatigue.

Mode for Carrying Out the Invention

The present invention is a thermoplastic resin composition comprising a polyamide resin and an ethylene-vinyl alcohol copolymer, and a modified rubber having an acid anhydride group or an epoxy group dispersed in the polyamide resin and the ethylene-vinyl alcohol copolymer, wherein the blending ratio between the polyamide resin and the ethylene-vinyl alcohol copolymer is from 47/53 to 61/39. The blending ratio between the polyamide resin and the ethylene-vinyl alcohol copolymer is preferably from 47/53 to 58/42. If this blending ratio is too small, the change in air permeability after fatigue is increased, whereas if the blending ratio is too large, bad air permeability before fatigue is incurred, as a result, the air permeability after fatigue is impaired.

The thermoplastic resin composition of the present invention is a thermoplastic resin composition comprising a polyamide resin and an ethylene-vinyl alcohol copolymer, and a modified rubber dispersed in the polyamide resin and the ethylene-vinyl alcohol copolymer, where the polyamide resin and the ethylene-vinyl alcohol copolymer form a matrix phase and the modified rubber forms a dispersed phase.

The polyamide resin for use in the present invention is not limited, and nylon 6, nylon 66, nylon 46, nylon 11, nylon 12, nylon 610, nylon 612, nylon 6/66, nylon MXD6 and nylon 6T can be used individually or as a mixture. Among these, nylon 6, nylon 66 and nylon 6/66 are preferred from the standpoint of satisfying both fatigue resistance and gas barrier property.

The ethylene-vinyl alcohol copolymer (hereinafter, sometimes referred to as "EVOH") for use in the present invention is a copolymer composed of an ethylene unit ($—CH_2CH_2—$) and a vinyl alcohol unit ($—CH_2—CH$ (OH)—), but as long as the effects of the present invention are not inhibited, the copolymer may contain other constituent units, in addition to the ethylene unit and the vinyl alcohol unit. The ethylene-vinyl alcohol copolymer for use in the present invention is preferably a copolymer having an ethylene unit content of 20 to 50 mol %. If the ethylene unit content of the ethylene-vinyl alcohol copolymer is too small, flexibility of the ethylene-vinyl alcohol copolymer is decreased and the durability becomes poor, whereas if the ethylene unit content is too large, air permeability increases. The ethylene-vinyl alcohol copolymer is a saponification product of an ethylene-vinyl acetate copolymer, and the saponification degree thereof is preferably 98% or more. If the saponification degree of the ethylene-vinyl alcohol copolymer is too small, air permeability increases. The ethylene-vinyl alcohol copolymer is commercially available, and examples thereof include Soanol® H4815B, A4412B, DC3212B and V2504RB produced by Nippon Synthetic Chemical Industry Co., Ltd. and EVAL® H171B produced by Kuraray Co., Ltd.

The modified rubber for use in the present invention has an acid anhydride group or an epoxy group. In view of compatibility with the polyamide resin, the modified rubber preferably has an acid anhydride group.

Examples of the rubber constituting the modified rubber include an ethylene-α-olefin copolymer and an ethylene-unsaturated carboxylic acid copolymer or a derivative thereof. Examples of the ethylene-α-olefin copolymer include an ethylene-propylene copolymer, an ethylene-butene copolymer, an ethylene-hexene copolymer, and an ethylene-octene copolymer. Examples of the ethylene-unsaturated carboxylic acid copolymer or a derivative thereof include an ethylene-acrylic acid copolymer, an ethylene-methacrylic acid copolymer, an ethylene-methyl acrylate copolymer, and an ethylene-methyl methacrylate copolymer.

The modified rubber having an acid anhydride group can be produced, for example, by reacting an acid anhydride and a peroxide with rubber. The content of the acid anhydride group in the modified rubber having an acid anhydride group is preferably from 0.01 to 1 mol/kg, more preferably from 0.05 to 0.5 mol/kg. If the content of the acid anhydride group is too small, bad dispersion of the modified rubber is incurred, whereas if it is too large, the processability is impaired. The modified rubber having an acid anhydride group is commercially available, and a commercial product can be used. Examples of the commercial product include a maleic anhydride-modified ethylene-propylene copolymer (TAFMER® MP-0620) and a maleic anhydride-modified ethylene-butene copolymer (TAFMER® MP-7020), which are produced by Mitsui Chemicals, Inc.

The modified rubber having an epoxy group can be produced, for example, by copolymerizing glycidyl methacrylate with rubber. The copolymerization ratio is not limited but, for example, glycidyl methacrylate is copolymerized in a ratio of 10 to 50 parts by weight per 100 parts by weight of rubber. The content of the epoxy group in the modified rubber having an epoxy group is preferably from 0.01 to 5 mol/kg, more preferably from 0.1 to 1.5 mol/kg. If the content of the epoxy group is too small, bad dispersion of the modified rubber is incurred, whereas if the content is too large, the processability is impaired. The modified rubber having an epoxy group is commercially available, and a commercial product can be used. Examples of the commercial product include an epoxy-modified ethylene-methyl acrylate copolymer (ESPLENE® EMA2752) produced by Sumitomo Chemical Co., Ltd.

In particular, the modified rubber is preferably an ethylene-α-olefin copolymer graft-modified with an acid anhydride group, and examples thereof include the above-described maleic anhydride-modified ethylene-butene copolymer (TAFMER® MP-7020) produced by Mitsui Chemicals, Inc.

The amount of the modified rubber in the thermoplastic resin composition is preferably from 70 to 280 parts by weight, more preferably from 80 to 180 parts by weight, based on 100 parts by weight of the total amount of the polyamide resin and the ethylene-vinyl alcohol copolymer. If the amount of the modified rubber is too small, the low-temperature durability is poor, whereas if the amount is too large, the fluidity during melting is reduced and bad film-forming property results.

The polyamide resin may be a modified polyamide resin. The modified polyamide resin as used herein means a resin obtained by melt-blending a polyamide resin and a compound capable of reacting with a terminal amino group of the polyamide resin. Hereinafter, the compound capable of reacting with a terminal amino group of the polyamide resin is sometimes referred to as "amino group-reactive compound". The modified polyamide resin has a small number of terminal amino groups or no terminal amino group and therefore, even when the composition is highly filled with the modified rubber having an acid anhydride group or an epoxy group, the fluidity is maintained and film formation is facilitated.

Examples of the amino group-reactive compound include a monofunctional epoxy compound, an isocyanate group-containing compound, an acid anhydride group-containing compound, and a halogenated alkyl group-containing compound, but in view of reactivity with a terminal amino group of the polyamide resin, a monofunctional epoxy compound is preferred.

Examples of the monofunctional epoxy compound include ethylene oxide, epoxypropane, 1,2-epoxybutane, 2,3-epoxybutane, 3-methyl-1,2-epoxybutane, 1,2-epoxypentane, 4-methyl-1,2-epoxypentane, 2,3-epoxypentane, 3-methyl-1,2-epoxypentane, 4-methyl-1,2-epoxypentane, 4-methyl-2,3-epoxypentane, 3-ethyl-1,2-epoxypentane, 1,2-epoxyhexane, 2,3-epoxyhexane, 3,4-epoxyhexane, 5-methyl-1,2-epoxyhexane, 4-methyl-1,2-epoxyhexane, 5-methyl-1,2-epoxyhexane, 3-ethyl-1,2-epoxyhexane, 3-propyl-1,2-epoxyhexane, 4-ethyl-1,2-epoxyhexane, 5-methyl-1,2-epoxyhexane, 4-methyl-2,3-epoxyhexane, 4-ethyl-2,3-epoxyhexane, 2-methyl-3,4-epoxyhexane, 2,5-dimethyl-3,4-epoxyhexane, 2,5-dimethyl-3,4-epoxyhexane, 3-methyl-1,2-epoxyheptane, 4-methyl-1,2-epoxyheptane, 5-methyl-1,2-epoxyheptane, 6-methyl-1,2-epoxyheptane, 3-ethyl-1,2-epoxyheptane, 3-propyl-1,2-epoxyheptane, 3-butyl-1,2-epoxyheptane, 4-propyl-2,3-epoxyheptane, 5-ethyl-1,2-epoxyheptane, 4-methyl-2,3-epoxyheptane, 4-ethyl-2,3-epoxyheptane, 4-propyl-2,3-epoxyheptane, 2-methyl-3,4-epoxyheptane, 5-methyl-3,4-epoxyheptane, 6-ethyl-3,4-epoxyheptane, 2,5-dimethyl-3,4-epoxyheptane, 2-methyl-5-ethyl-3,4-epoxyheptane, 1,2-epoxyheptane, 2,3-epoxyheptane, 3,4-epoxyheptane, 1,2-epoxyoctane, 2,3-epoxyoctane, 3,4-epoxyoctane, 4,5-epoxyoctane, 1,2-epoxynonane, 2,3-epoxynonane, 3,4-epoxynonane, 4,5-epoxynonane, 1,2-epoxydecane, 2,3-epoxydecane, 3,4-epoxydecane, 4,5-epoxydecane, 5,6-epoxydecane, 1,2-epoxyundecane, 2,3-epoxyundecane, 3,4-epoxyundecane, 5,6-epoxyundecane, 1,2-epoxydodecane, 2,3-epoxydodecane, 3,4-epoxydodecane, 4,5-epoxydodecane, 5,6-epoxydodecane, 6,7-epoxydodecane, epoxyethylbenzene, 1-phenyl-1,2-epoxypropane, 3-phenyl-1,2-epoxypropane, 1-phenyl-1,2-epoxybutane, 3-phenyl-1,2-epoxybutane, 4-phenyl-1,2-epoxybutane, 3-phenyl-1,2-epoxypentane, 4-phenyl-1,2-epoxypentane, 5-phenyl-1,2-epoxypentane, 1-phenyl-1,2-epoxyhexane, 3-phenyl-1,2-epoxyhexane, 4-phenyl-1,2-epoxyhexane, 5-phenyl-1,2-epoxyhexane, 6-phenyl-1,2-epoxyhexane, glycidol, 3,4-epoxy-1-butanol, 4,5-epoxy-1-pentanol, 5,6-epoxy-1-hexanol, 6,7-epoxy-1-heptanol, 7,8-epoxy-1-octanol, 8,9-epoxy-1-nonanol, 9,10-epoxy-1-decanol, 10,11-epoxy-1-undecanol, 3,4-epoxy-2-butanol, 2,3-epoxy-1-butanol, 3,4-epoxy-2-pentanol, 2,3-epoxy-1-pentanol, 1,2-epoxy-3-pentanol, 2,3-epoxy-4-methyl-1-pentanol, 2,3-epoxy-4,4-dimethyl-1-pentanol, 2,3-epoxy-1-hexanol, 3,4-epoxy-2-hexanol, 4,5-epoxy-3-hexanol, 1,2-epoxy-3-hexanol, 2,3-epoxy-4-methyl-1-hexanol, 2,3-epoxy-4-ethyl-1-hexanol, 2,3-epoxy-4,4-dimethyl-1-hexanol, 2,3-epoxy-4,4-diethyl-1-hexanol, 2,3-epoxy-4-methyl-1-hexanol, 3,4-epoxy-5-methyl-2-hexanol, 3,4-epoxy-5,5-dimethyl-2-hexanol, 3,4-epoxy-3-heptanol, 2,3-epoxy-1-heptanol, 4,5-epoxy-3-heptanol, 2,3-epoxy-4-heptanol, 1,2-epoxy-3-heptanol, 2,3-epoxy-1-octanol, 3,4-epoxy-3-octanol, 4,5-epoxy-3-octanol, 5,6-epoxy-4-octanol, 2,3-epoxy-4-octanol, 1,2-epoxy-3-octanol, 2,3-epoxy-1-nonanol, 3,4-epoxy-2-nonanol, 4,5-epoxy-3-nonanol, 5,6-epoxy-5-nonanol, 3,4-epoxy-5-nonanol, 2,3-epoxy-4-nonanol, 1,2-epoxy-3-nonanol, 2,3-epoxy-1-decanol, 3,4-epoxy-2-decanol, 4,5-epoxy-3-decanol, 5,6-epoxy-4-decanol, 6,7-epoxy-5-decanol, 3,4-epoxy-5-decanol, 2,3-epoxy-4-decanol, 1,2-epoxy-3-decanol, 1,2-epoxycyclopentane, 1,2-epoxycyclohexane, 1,2-epoxycycloheptane, 1,2-epoxycyclooctane, 1,2-epoxycyclononane, 1,2-epoxycyclodecane, 1,2-epoxycyclododecane, 3,4-epoxycyclopentene, 3,4-epoxycyclohexene, 3,4-epoxycycloheptene, 3,4-epoxycyclooctene, 3,4-epoxycyclononene, 1,2-epoxycyclodecene, 1,2-epoxycycloundecane, 1,2-epoxycyclododecene, 1-butoxy-2,3-epoxypropane, 1-allyloxy-2,3-epoxypropane, polyethylene glycol butyl glycidyl ether, 2-ethylhexyl glycidyl ether, phenyl glycidyl ether, and p-sec-butylphenyl glycidyl ether. Above all, in view of compatibility with the polyamide resin, an epoxy compound having a carbon number of 3 to 20, preferably from 3 to 13, and having an ether and/or hydroxy group is preferred.

The method for melt-blending the polyamide resin and the amino group-reactive compound is not particularly limited but, for example, the polyamide resin and the amino group-reactive compound are charged into a twin-screw kneader and melt-blended at a temperature not lower than the melting point, preferably at a temperature 20° C. or more higher than the melting point, of the polyamide resin, for example, at 240° C. The melt-blending time is, for example, from 1 to 10 minutes, preferably from 2 to 5 minutes.

The amount of the amino group-reactive compound used for the modification of the polyamide resin is from 0.05 to 5 parts by weight, preferably from 1 to 3 parts by weight, based on 100 parts by weight of the polyamide resin. If the amount of the amino group-reactive compound is too small, the effect of improving the fluidity when highly filled with the modified rubber is disadvantageously small, whereas if the amount is too large, the low-temperature durability (resistance to repeated fatigue) of the polyamide resin is deteriorated and this is not preferred.

In the thermoplastic resin composition of the present invention, the air permeability after repeatedly applying a 20% elongation strain 1,000,000 times at room temperature is preferably $10 \times 10^{12}$ cc·cm/cm$^2$·sec·cmHg or less, more preferably from $1 \times 10^{12}$ to $8 \times 10^{12}$ cc·cm/cm$^2$·sec·cmHg.

The air permeability as used herein means an air permeation coefficient measured at 55° C. according to JIS K7126-1 "Gas Permeability Test Method (Differential Pressure Method) of Plastic Film and Sheet".

In the thermoplastic resin composition of the present invention, the change in air permeability when a 20% elongation strain is repeatedly applied 1,000,000 times at room temperature is preferably 1.30 times or less, more preferably from 1.00 to 1.20 times.

The change in air permeability as used herein means a value obtained by dividing the air permeability after repeatedly applying a strain by the air permeability before repeatedly applying a strain and is defined by the following formula:

Change in air permeability=air permeability after
repeatedly applying strain/air permeability
before repeatedly applying strain The thermoplastic resin composition of the present invention can be produced, for example, by melting and mixing the polyamide resin, the ethylene-vinyl alcohol copolymer and the modified rubber at a temperature 20° C. higher than the melting point of the polyamide resin.

In the thermoplastic resin composition of the present invention, in addition to the above-described components, other reinforcing agents (filler) such as carbon black and silica, and various additives generally blended in a resin or a rubber composition, such as vulcanizing or crosslinking agent, vulcanization or crosslinking accelerator, plasticizer, various oils and antioxidant, may be blended, and these additives may be kneaded by a general method to make a composition and used for vulcanization or crosslinking. The blending amount of such an additive may be an amount conventionally employed in general as long as the object of the present invention is not impaired.

The thermoplastic resin composition of the present invention can be formed into a film by an extruder with a T-die, an inflation molding machine, or the like. The film formed has a low air permeability and therefore, can be suitably used as an inner liner of a pneumatic tire.

The pneumatic tire of the present invention is a pneumatic tire in which a film composed of the above-described thermoplastic resin composition is used as an inner liner. As the method for producing the tire, a commonly employed method may be employed. For example, the thermoplastic resin composition of the present invention is previously extruded into a film having predetermined width and thickness, and the film is cylindrically laminated onto a tire forming drum. On the film, members usually used for the production of a tire, such as carcass layer, belt layer and tread layer each formed of non-vulcanized rubber, are sequentially laminated one on another, and the drum is removed to obtain a green tire. Thereafter, this green tire is thermally vulcanized in accordance with a conventional method, whereby a desired pneumatic tire can be produced.

In the pneumatic tire of the present invention, the "air leakage" after 70,000 km indoor running is preferably 1.5% or less.

The "air leakage" as used herein means a value obtained by leaving a tire to stand in an atmosphere of an air pressure of 250 kPa and 25° C. for 3 months, measuring the change in tire air pressure, and expressing the decrement of tire air pressure in % and is defined by the following formula:

Air leakage (%)=(initial tire air pressure−tire air
pressure after being left standing for 3 months)/
initial tire air pressure×100

In the pneumatic tire of the present invention, the change in air leakage after 70,000 km indoor running is preferably 1.30 times or less, more preferably from 1.00 to 1.20 times.

The "change in air leakage" as used herein means a ratio obtained by dividing "air leakage" after 70,000 km indoor running by "air leakage" at the initial stage (before running) and is defined by the following formula:

Change in air leakage=air leakage after 70,000 km indoor running/air leakage at the initial stage (before running)

EXAMPLES

(1) Raw Materials

The raw materials used in Examples and Comparative Examples are as follows.

As the polyamide resin, nylon 6/66, "UBE Nylon" 5033B, produced by Ube Industries, Ltd. was used.

As the ethylene-vinyl alcohol copolymer (simply referred to as "EVOH"), Soanol® H4412B produced by Nippon Synthetic Chemical Industry Co., Ltd. was used.

As the modified rubber, a maleic anhydride-modified ethylene-butene copolymer (TAFMER® MH-7020 produced by Mitsui Chemicals, Inc.) was used.

As the compound capable of combining with a terminal amino group of the polyamide resin, p-sec-butylphenyl glycidyl ether (Epiol® SB produced by NOF Corporation) was used.

(2) Preparation of Thermoplastic Resin Composition

The polyamide resin, the ethylene-vinyl alcohol copolymer and the modified rubber were charged into a twin-screw kneader in the weight ratio shown in Tables 1 and 2 and melt-kneaded at a kneader temperature of 230° C., and the mixture was continuously extruded into strands from the extruder, then cooled with water and cut by a cutter to prepare a pellet-like thermoplastic resin composition.

Also, 100.0 parts by weight of the polyamide resin and 2.0 parts by weight of p-sec-butylphenyl glycidyl ether were charged into a twin-screw kneader (TEX44 manufactured by Japan Steel Works, Ltd.) and melt-kneaded at a kneader temperature of 230° C. to prepare a modified polyamide resin. The modified polyamide resin, the ethylene-vinyl alcohol copolymer and the modified rubber were charged into a twin-screw kneader and melt-kneaded at a kneader temperature of 230° C., and the mixture was continuously extruded into strands from the extruder, then cooled with water and cut by a cutter to prepare a pellet-like thermoplastic resin composition.

(3) Evaluation Method of Thermoplastic Resin Composition

The prepared thermoplastic resin composition was evaluated for air permeability and tire air leakage.

(a) Air Permeability

After forming the thermoplastic resin composition into a film of 0.15 mm and drying the film at 150° C. for 3 hours or more, the air permeability of the thermoplastic resin composition film was measured at a test temperature of 55° C. by using air as the test gas in accordance with JIS K7126-1 "Gas Permeability Test Method (Differential Pressure Method) of Plastic Film and Sheet".

(b) Change in Air Permeability after Fatigue

A non-vulcanized rubber composition prepared according to the formulation shown in Table 4 was formed into a 0.5 mm-thick film. This non-vulcanized rubber composition film was laminated with a thermoplastic resin composition film produced in the same manner as in the test method of "(a) Air Permeability" above and vulcanized at 180° C. for 10 minutes. The obtained laminate was measured for air permeability in the same manner as in the test method of "(a) Air Permeability" above. After measuring the air permeability, the test piece was repeatedly elongated 1,000,000 times at room temperature under the conditions of an elongation percentage of 20% and 400 times per minute and thereby fatigued. The test piece after fatigue was measured for air permeability in the same manner as in the test method of "(a) Air Permeability" above, and the change in air permeability defined by the following formula was calculated.

Change in air permeability due to fatigue=air permeability after fatigue/air permeability before fatigue When the change in air permeability due to fatigue is 1.30 times or less, this is judged as passed.

When the air permeability after fatigue is $10 \times 10^{12}$ cc·cm/cm²·sec·cmHg or less, this is judged as passed.

[Tire Air Leakage]

The thermoplastic resin composition was formed into a film with a thickness of 80 μm, and by using the film as an inner liner, a radial tire 195/65R15 was produced by a conventional method. After the produced tire was left standing for 3 months in an atmosphere of air pressure of 250 kPa and 21° C., the change in tire air pressure was measured, and the decrement of tire air pressure, which is expressed in %, was taken as "tire air leakage". The tire air leakage was measured also after air was sealed into the produced tire indoors to a pressure of 140 kPa with a standard rim specified in JATMA Standards and on a drum having an outer diameter of 1,700 mm, the tire was caused to run a distance of 70,000 km at a room temperature of 38° C., a load of 300 kN and a speed of 80 km/h. The tire air leakage before running is referred to as "tire air leakage before fatigue", and the tire air leakage after running is referred to as "tire air leakage after fatigue". The ratio of the tire air leakage after fatigue to the tire air leakage before fatigue is taken as "change in tire air leakage due to fatigue". When the change in tire air leakage due to fatigue is 1.30 times or less, this is judged as passed.

(4) Evaluation Results of Thermoplastic Resin Composition

The evaluation results are shown in Tables 1 and 2.

TABLE 1

| | Comparative Example | | | | | | Example | | |
|---|---|---|---|---|---|---|---|---|---|
| | 1 | 2 | 3 | 4 | 5 | 6 | 1 | 2 | 3 |
| Polyamide resin [parts by weight] | 10.1 | 20.2 | 30.3 | 40.4 | 42.9 | 45.4 | 47.9 | 50.4 | 52.9 |
| EVOH [parts by weight] | 89.9 | 79.8 | 69.7 | 59.6 | 57.1 | 54.6 | 52.1 | 49.6 | 47.1 |
| Modified rubber [parts by weight] | 77.6 | 77.4 | 77.3 | 77.2 | 77.2 | 77.2 | 77.1 | 77.1 | 77.1 |
| Total [parts by weight] | 177.6 | 177.4 | 177.3 | 177.2 | 177.2 | 177.2 | 177.1 | 177.1 | 177.1 |
| Air permeability before fatigue [$10^{12}$ cc · cm/cm² · sec · cmHg] | 3.2 | 3.2 | 3.8 | 4.8 | 5.1 | 5.2 | 5.9 | 6.3 | 6.7 |
| Air permeability after fatigue [$10^{12}$ cc · cm/cm² · sec · cmHg] | 23.5 | 10.0 | 8.0 | 6.9 | 6.9 | 6.9 | 6.9 | 6.9 | 7.1 |

TABLE 1-continued

|  | Comparative Example | | | | | | Example | | |
|---|---|---|---|---|---|---|---|---|---|
|  | 1 | 2 | 3 | 4 | 5 | 6 | 1 | 2 | 3 |
| Change in air permeability due to fatigue [times] | 7.3 | 3.1 | 2.1 | 1.44 | 1.35 | 1.33 | 1.17 | 1.10 | 1.06 |
| Tire air leakage before fatigue [%] | 0.9 | 0.9 | 0.9 | 1.0 | 1.0 | 1.0 | 1.1 | 1.1 | 1.2 |
| Tire air leakage after fatigue [%] | 6.4 | 2.7 | 1.9 | 1.4 | 1.4 | 1.4 | 1.3 | 1.2 | 1.2 |
| Change in tire air leakage due to fatigue [times] | 7.1 | 3.0 | 2.1 | 1.40 | 1.40 | 1.40 | 1.18 | 1.09 | 1.00 |

TABLE 2

|  | Example | | | Comparative Example | | | | |
|---|---|---|---|---|---|---|---|---|
|  | 4 | 5 | 6 | 7 | 8 | 9 | 10 | 11 |
| Polyamide resin [parts by weight] | 55.4 | 57.9 | 60.4 | 59.5 | 70.3 | 90.1 | 40.4 | 40.4 |
| EVOH [parts by weight] | 44.6 | 42.1 | 39.6 | 40.5 | 29.7 | 9.9 | 59.6 | 59.6 |
| Modified rubber [parts by weight] | 77.0 | 77.0 | 77.0 | 70.0 | 76.9 | 76.6 | 15.4 | 0.0 |
| Total [parts by weight] | 177.0 | 177.0 | 177.0 | 170.0 | 176.9 | 176.6 | 115.4 | 100.0 |
| Air permeability before fatigue [$10^{12}$ cc · cm/cm$^2$ · sec · cmHg] | 7.2 | 7.7 | 8.0 | 9.5 | 10.7 | 17.0 | 0.13 | 0.10 |
| Air permeability after fatigue [$10^{12}$ cc · cm/cm$^2$ · sec · cmHg] | 7.8 | 8.0 | 8.5 | 10.4 | 11.6 | 18.6 | 1.60 | 1.40 |
| Change in air permeability due to fatigue [times] | 1.08 | 1.04 | 1.06 | 1.09 | 1.08 | 1.09 | 12.3 | 14.0 |
| Tire air leakage before fatigue [%] | 1.2 | 1.2 | 1.3 | 1.4 | 1.5 | 2.0 | 0.6 | 0.6 |
| Tire air leakage after fatigue [%] | 1.3 | 1.3 | 1.3 | 1.4 | 1.6 | 2.2 | 7.5 | 8.5 |
| Change in tire air leakage due to fatigue [times] | 1.08 | 1.08 | 1.00 | 1.02 | 1.07 | 1.10 | 12.5 | 14.2 |

TABLE 4

Formulation of Non-Vulcanized Rubber Composition

| Raw Material | Amount (parts by weight) |
|---|---|
| Butyl halide rubber[1] | 100 |
| GPF Carbon black[2] | 30 |
| Wet silica[3] | 20 |
| Aroma oil[4] | 7.5 |
| Zinc oxide[5] | 3 |
| Stearic acid[6] | 1 |
| Sulfur[7] | 1 |
| Vulcanization accelerator[8] | 1.5 |
| Total | 164 |

Note:
[1]BROMOBUTYL X2 produced by LANXESS Rubber.
[2]HTC #G produced by Nippon Steel Chemical Carbon Co., Ltd.
[3]Zeosil (registered trademark) 165GR produced by Rhodia
[4]Extract No. 4 S produced by Showa Shell Sekiyu K.K.
[5]Zinc Oxide Type 3 produced by Seido Chemical Industry Co., Ltd.
[6]Beads Stearic Acid YR produced by NOF Corporation
[7]"Kinka" Brand Fine Powder Sulfur 150 Mesh produced by Tsurumi Chemical Industry Co., Ltd.
[8]Nocceler DM produced by Ouchi Shinko Chemical Industrial Co., Ltd.

INDUSTRIAL APPLICABILITY

The thermoplastic resin composition of the present invention can be suitably utilized as an inner liner of a pneumatic tire.

The invention claimed is:

1. A thermoplastic resin composition comprising a matrix phase which comprises a polyamide resin, wherein the polyamide is not modified with a plasticizer and an ethylene-vinyl alcohol copolymer, and a rubber modified with an acid anhydride group or an epoxy group dispersed in the matrix phase comprising the polyamide resin and the ethylene-vinyl alcohol copolymer, wherein the blending ratio between the polyamide resin and the ethylene-vinyl alcohol copolymer is from 47/53 to 61/39, wherein the composition does not contain a plasticizer.

2. The thermoplastic resin composition according to claim 1, wherein the polyamide resin is at least one selected from the group consisting of nylon 6, nylon 66 and nylon 6/66.

3. The thermoplastic resin composition according to claim 2, wherein the rubber modified with an acid anhydride group or an epoxy group is an ethylene-α-olefin copolymer having an acid anhydride group or an epoxy group, or an ethylene-acrylic acid copolymer having an acid anhydride group or an epoxy group, an ethylene-methacrylic acid copolymer having an acid anhydride group or an epoxy group, an ethylene-methyl acrylate copolymer having an acid anhydride group or an epoxy group, an ethylene-methyl methacrylate copolymer having an acid anhydride group or an epoxy group.

4. The thermoplastic resin composition according to claim 2, wherein the content of the rubber modified with an acid anhydride group or an epoxy group is from 70 to 280 parts by weight based on 100 parts by weight of the total amount of the polyamide resin and the ethylene-vinyl alcohol copolymer.

5. The thermoplastic resin composition according to claim 2, wherein the change in air permeability when a 20% elongation strain is repeatedly applied 1,000,000 times at room temperature is 1.30 times or less.

6. The thermoplastic resin composition according to claim 2, wherein the air permeability after repeatedly applying a 20% elongation strain 1,000,000 times at room temperature is $10 \times 10^{12}$ cc·cm/cm$^2$·sec·cmHg or less.

7. The thermoplastic resin composition according to claim 1, wherein the rubber modified with an acid anhydride group or an epoxy group is an ethylene-α-olefin copolymer having an acid anhydride group or an epoxy group, or an ethylene-acrylic acid copolymer having an acid anhydride group or an epoxy group, an ethylene-methacrylic acid copolymer having an acid anhydride group or an epoxy group, an ethylene-methyl acrylate copolymer having an acid anhydride group or an epoxy group, or an ethylene-methyl methacrylate copolymer having an acid anhydride group or an epoxy group.

8. The thermoplastic resin composition according to claim 7, wherein the content of the rubber modified with an acid anhydride group or an epoxy group is from 70 to 280 parts by weight based on 100 parts by weight of the total amount of the polyamide resin and the ethylene-vinyl alcohol copolymer.

9. The thermoplastic resin composition according to claim 7, wherein the change in air permeability when a 20% elongation strain is repeatedly applied 1,000,000 times at room temperature is 1.30 times or less.

10. The thermoplastic resin composition according to claim 7, wherein the air permeability after repeatedly applying a 20% elongation strain 1,000,000 times at room temperature is $10 \times 10^{12}$ cc·cm/cm$^2$·sec·cmHg or less.

11. The thermoplastic resin composition according to claim 1, wherein the content of the rubber modified with an acid anhydride group or an epoxy group is from 70 to 280 parts by weight based on 100 parts by weight of the total amount of the polyamide resin and the ethylene-vinyl alcohol copolymer.

12. The thermoplastic resin composition according to claim 11, wherein the change in air permeability when a 20% elongation strain is repeatedly applied 1,000,000 times at room temperature is 1.30 times or less.

13. The thermoplastic resin composition according to claim 11, wherein the air permeability after repeatedly applying a 20% elongation strain 1,000,000 times at room temperature is $10 \times 10^{12}$ cc·cm/cm$^2$·sec·cmHg or less.

14. The thermoplastic resin composition according to claim 1, wherein the change in air permeability when a 20% elongation strain is repeatedly applied 1,000,000 times at room temperature is 1.30 times or less.

15. The thermoplastic resin composition according to claim 1, wherein the air permeability after repeatedly applying a 20% elongation strain 1,000,000 times at room temperature is $10 \times 10^{12}$ cc·cm/cm$^2$·sec·cmHg or less.

16. The thermoplastic resin composition according to claim 1, wherein the polyamide resin is a modified polyamide resin obtained by melt-blending a polyamide resin and a compound capable of reacting with a terminal amino group of the polyamide resin, said compound being other than said rubber modified with an acid anhydride group or an epoxy group.

17. The thermoplastic resin composition according to claim 16, wherein the compound capable of reacting with a terminal amino group of the polyamide resin has one group being reactive with said terminal amino group and is a monofunctional epoxy compound.

18. A pneumatic tire comprising, as an inner liner, a film comprising the thermoplastic resin composition according to claim 1.

19. The pneumatic tire according to claim 18, wherein the change in air leakage after 70,000 km indoor running is 1.30 times or less.

20. The pneumatic tire according to claim 18, wherein the air leakage after 70,000 km indoor running is 1.5% or less.

* * * * *